United States Patent [19]

Bell

[11] 4,160,626
[45] Jul. 10, 1979

[54] DRIVE ROD COUPLING FOR POSITIVE DISPLACEMENT PUMP
[75] Inventor: Robert R. Bell, Houston, Tex.
[73] Assignee: Vapor Corporation, Chicago, Ill.
[21] Appl. No.: 834,797
[22] Filed: Sep. 19, 1977

Related U.S. Application Data
[63] Continuation of Ser. No. 661,308, Feb. 25, 1978, abandoned.

[51] Int. Cl.² .............................................. F04B 17/00
[52] U.S. Cl. ...................................... 417/403; 92/84; 92/129; 403/77; 403/122
[58] Field of Search .................... 92/129, 84; 403/144, 403/77, 126, 135, 138; 417/403, 404; 308/72

[56] References Cited
U.S. PATENT DOCUMENTS

| | | | |
|---|---|---|---|
| 1,200,337 | 10/1916 | Fraser | 417/404 X |
| 1,639,692 | 8/1927 | Gauthier | 403/135 |
| 1,866,057 | 7/1932 | Reid | 92/187 X |
| 1,902,038 | 3/1933 | McAllister | 403/144 |
| 1,996,826 | 4/1935 | Ohmart | 403/14 X |
| 2,855,665 | 10/1958 | Alldredge | 403/144 X |
| 3,406,992 | 10/1968 | Grotness | 403/77 X |
| 3,670,630 | 6/1972 | Tyson et al. | 92/129 |

FOREIGN PATENT DOCUMENTS 852478 10/1952 Fed. Rep. of Germany ........... 403/144
666218 2/1952 United Kingdom ...................... 417/404

Primary Examiner—Irwin C. Cohen
Attorney, Agent, or Firm—Francis J. Lidd

[57] ABSTRACT

A coupling device for coupling two rigid, elongated reciprocating elements while maintaining contact between the elements and eliminating relative longitudinal movement includes a hemispherically faced connector head connected to one of the elements. The coupling device further includes a retainer connected to the other of said elements into which the head is positioned. The connector head is contained in the retainer by a retaining member and biased against a bearing within the retainer by a plurality of Belleville washers. The force developed by the washers is sufficient to maintain the hemispherically faced connector head in contact with the connector bearing to insure that the connector head and bearing do not separate relative to each other during reciprocation of the rigid elements.

3 Claims, 3 Drawing Figures

DRIVE ROD COUPLING FOR POSITIVE DISPLACEMENT PUMP

This application is a continuation of application Ser. No. 661,308 filed Feb. 25, 1976, and now abandoned.

BACKGROUND OF THE INVENTION

A. Field of the Invention

The present invention relates to a new and improved coupling that functions as a preloaded member coupling two reciprocating elements. More specifically, the present invention is directed to a new and improved drive rod coupling member for coupling the plunger and piston rod of a gas operated positive displacement pump while maintaining sufficient contact between the two to prevent damage due to separation.

B. Description of the Prior Art

Due to the decreasing supplies of oil and the increasing demand, many different methods of obtaining maximum oil from wells are currently being used. One of these methods employs a gas operated, positive displacement pump that may be operated by high pressure air, natural gas or any other available fluid. These gas operated positive displacement pumps are of rugged construction and are employed for water flooding oil wells.

Often times, several of these pumps are manifolded together to force large quantitites of water in a short amount of time into an oil well in order to increase the oil well's production by making the oil more readily available.

Current pumps employed in the oil field utilize a fluid drive piston connected to a high pressure fluid plunger. Both of these driven components of these pumps are alignment sensitive, since they operate at rapid rates and at high forces. Accordingly, if a slight misalignment between the driven and drive components occurs, excessive plunger and packing wear is caused resulting in rapid deterioration of these elements.

Typically, the piston rod and the plunger of these prior art pumps are rigidly connected requiring precision boring and extreme care in assembly in order to accomplish a high degree of accuracy in axial alignment. A slight misalignment during fabrication or assembly results in rapid deterioration of the plunger, piston rod and the packing for each.

Moreover, any misalignment between the piston rod and the plunger of the pump that is not continuously absorbed by the coupling apparatus, whether it be rigid or otherwise, results in excessive movement of both the piston rod in the drive cylinder packing and the pump plunger in the pump cylinder packing. This excessive movement greatly reduces the life of the packing and if continued over sufficiently long periods of time, can result in piston rod and plunger interference in their respective confinements and eventual destruction thereof.

SUMMARY OF THE INVENTION

An object of the present invention is to provide a new and improved device for connecting reciprocating elongated members.

Another object of the present invention is to provide a new and improved device for coupling two elongated reciprocating members allowing relative angular and axial misalignment, while maintaining sufficient contact between the members at the point of coupling to prevent damage to either due to impact during the reversal of the reciprocating stroke.

Moreover, another object of the present invention is to provide a new and improved device for coupling the piston rod to the fluid plunger of a gas operated positive displacement pump.

Briefly, the present invention is a new and improved coupling device for connecting the piston rod of a fluid operated, high pressure pump to an elongated plunger member to allow the reciprocating motion of the piston rod to be imparted to the plunger. The reciprocation of the plunger functions to pump fluid to a desired location at a high pressure.

Typically, gas operated, positive displacement pumps are employed for secondary oil recovery throughout the world. The principal application of this type of pump is in water flooding of oil wells. In such an operation, large quantities of water are forced by one or more of these pumps into an oil well to increase the well's production. Such an application requires an extremely rugged construction, since the pump is used in the field and often uses oil well gases as the working fluid.

Gas operated reciprocating high pressure pumps employ a drive piston that is rigidly connected to a piston rod. During operation of the pump, the piston is reciprocated within the piston cylinder of the pump. Reciprocation of the pump is accomplished by utilization of switch valves and a conventional reversing spool valve. In this manner, fluid flows into the piston cylinder through ports. This flow is alternated in direction by the spool valve causing a reciprocating motion of the piston, and, accordingly, a similar movement is imparted to the piston rod.

To pump water or similar fluid at a high pressure into oil wells, a high pressure fluid plunger is used in the pump. The plunger must be connected to the piston rod to be reciprocated thereby, so that in one direction the plunger draws fluid into a chamber and in the reverse direction forces the fluid at a high pressure to the oil well.

In order to allow the power piston rod and the fluid plunger to be less alignment sensitive and therefore reduce the precision boring and extreme care in assembly required in the prior art pumps, the coupling of the present invention is used. This coupling includes a connector head fabricated of stainless steel or similar material that is rigidly secured to either the piston rod or the fluid plunger. Attached to the other member is a retainer. The connector head is positioned into this retainer.

The connector head has a substantially hemispherical face. Abutting this face and located between a closed end of the retainer and the connector head is a bearing fabricated of steel or similar material. The bearing surface abutting the connector face is of a mating configuration allowing slight angular movement of the head relative to the bearing along the curved abutting surfaces.

Opposite the hemispherical face of the connector head and separated therefrom is a backup plate secured within the retainer. Positioned behind the backup plate is a cap that is threadably secured within the retainer and serves to lock the bearing head and backup plate within the retainer.

Mounted between the backup plate and the cap are several Belleville washers. These washers serve to bias the backup plate and connector head against the bearing within the retainer. In this manner, the connector head is allowed to rotate through the interaction of its hemispherical face against the bearing while the Belleville washers provide sufficient force to maintain contact between the two points of coupling — the point of contact between the bearing and head.

The contact maintained by the Belleville washers prevents damage to either the piston rod or the plunger that may result from impact on reversal of stroke of the pump. The coupling also prevents excessive movement of either the piston rod or the plunger in their respective packings, thereby extending the life of the pump.

BRIEF DESCRIPTION OF THE DRAWINGS

The above and other objects and advantages and novel features of the present invention will become apparent from the following detailed description of the preferred embodiment of the invention illustrated in the accompanying drawings wherein.

DESCRIPTION OF THE PREFERRED EMBODIMENT

Figure 1:
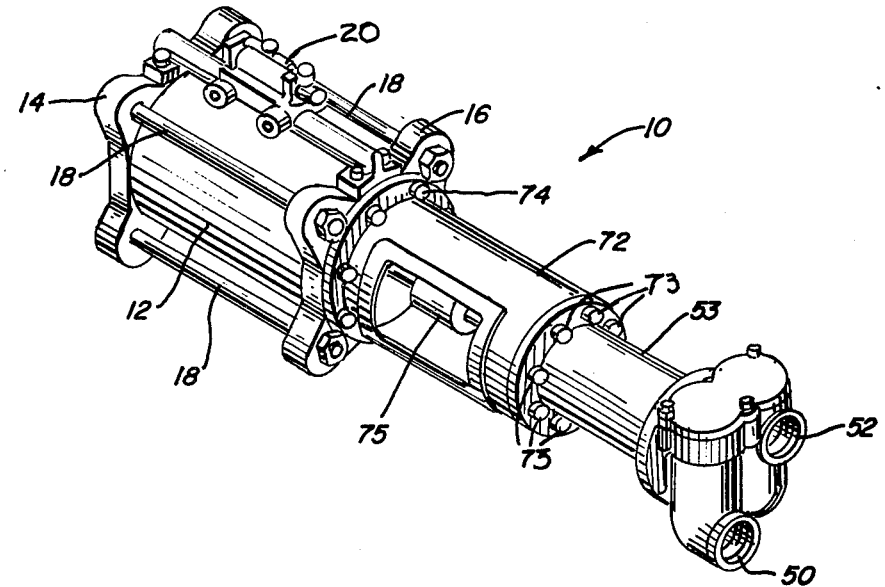
FIG. 1 is a perspective view of a gas operated, positive displacement pump including a coupling constructed in accordance with the principles of the present invention.
Figure 3:
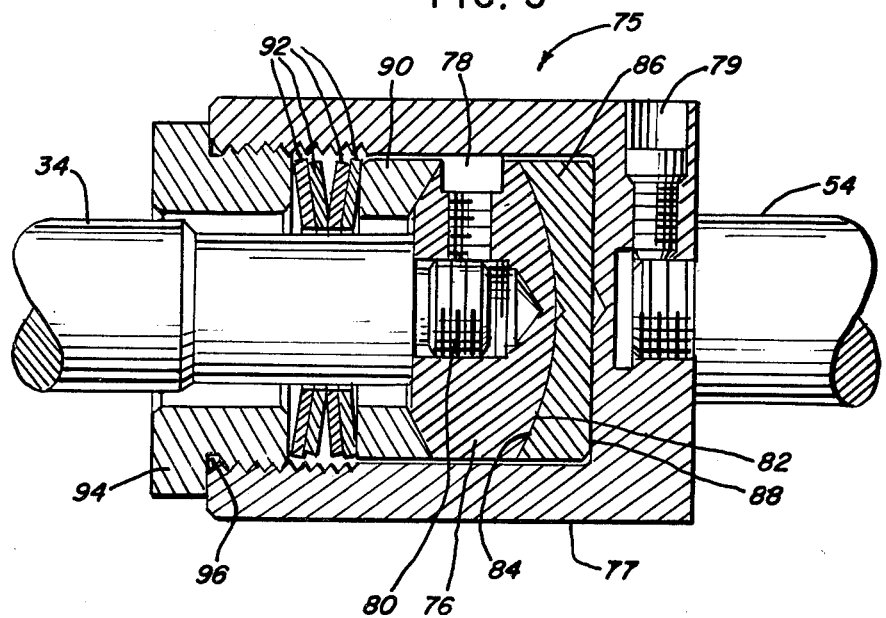
FIG. 3 is an enlarged, sectional view of the coupling device illustrated in FIG. 1.
Figure 2:
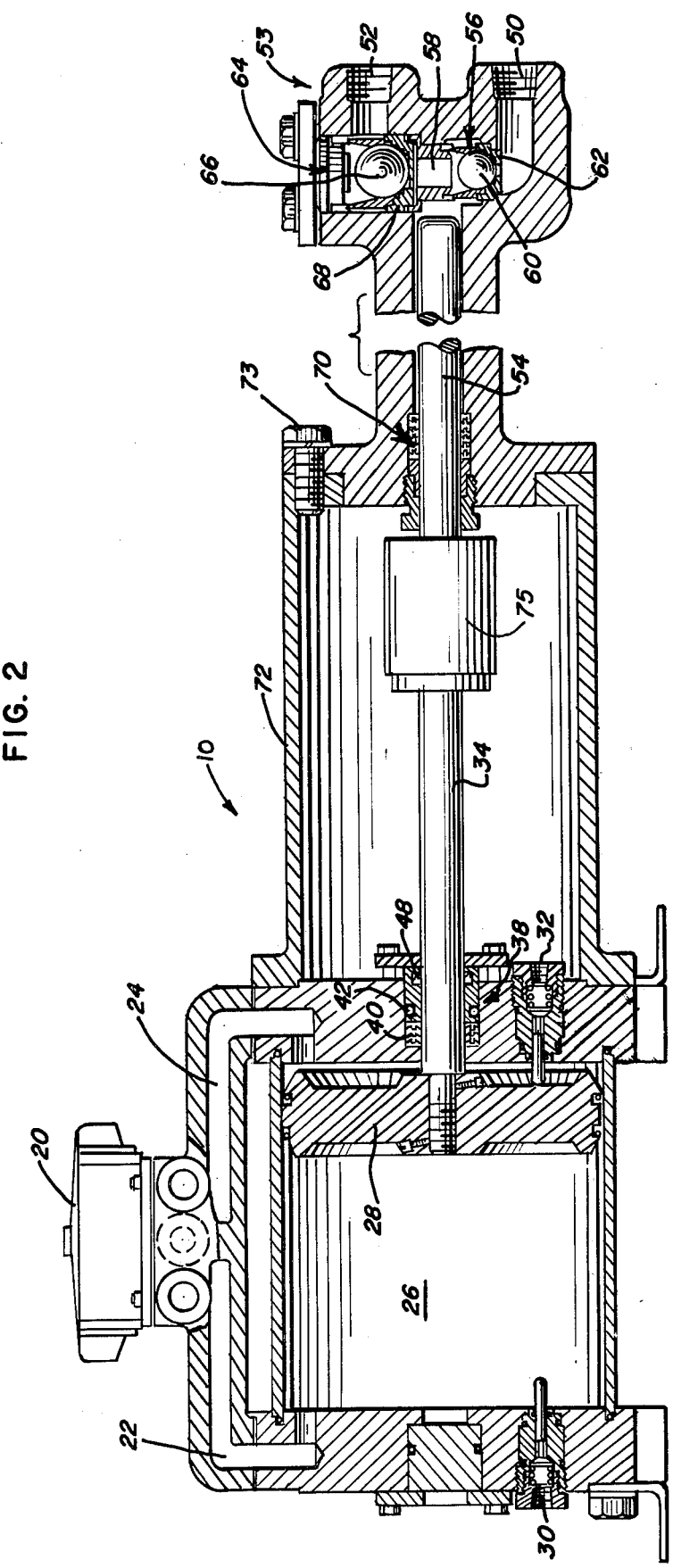
FIG. 2 is an enlarged, sectional view of the device of the present invention illustrated in FIG. 1.

With reference to FIGS. 1–3, therein is disclosed a conventional gas operated, positive displacement pump 10. The pump 10 includes a drive cylinder 12 rigidly secured between end caps 14 and 16 by a plurality of studs or bolts 18.

The pump 10 employs a typical reversing spool valve 20 that functions to direct high pressure fluid alternately through the conduits 22 and 24 (FIG. 2). The conduits 22 and 24 direct fluid into alternate ends of the piston drive chamber 26. In this manner, the piston 28 is influenced by high pressure fluids on alternate sides thereof causing reciprocating motion. Reciprocation of the pump stroke is accomplished by the piston 28 abutting either of the switch valves 30 and 32. These valves 30 and 32 relieve spool valve 20 thereby allowing it to shift, thus alternating the fluid flow to drive chamber 26.

Rigidly attached to piston 28 is a piston rod 34. To prevent fluid leakage from the drive cylinder 26 around the rod 34, a drive cylinder packing 38 is employed. This drive cylinder packing 38 includes packing 40, a bushing 42 with an O-ring 44, and a wiper 48.

The pump 10 (FIG. 1) may be employed in oil fields for pumping large quantities of fluid such as water under high pressure into oil wells allowing more efficient oil production. To accomplish its pumping function, the pump 10 includes a fluid inlet 50 and a fluid outlet 52 fabricated in the plunger cylinder 53.

Fluid is drawn through the inlet 50 by the reciprocation or withdrawal of the fluid plunger 54 out of the chamber 58 (FIG. 2). During withdrawal of the fluid plunger 54, fluid is drawn into inlet 50 through a one-way check valve 56. Reverse flow is prevented by the interaction of ball 60 in its seat 62.

During the alternate reciprocal movement of the plunger 54, a fluid is forced through outlet 52 from the chamber 58 by passing through the one-way check valve 64. The reversal of fluid through outlet 52 is prevented by the interaction of ball 66 in its seat 68.

Leakage of fluid around the fluid plunger 54 is prevented by a pump cylinder packing 70 similar to the drive cylinder packing 38.

The plunger cylinder 53 is secured to a coupling cylinder 72 by bolts 73. The coupling cylinder 72 is in turn attached to end cap 16 by a series of bolts 74.

In order to reduce the precision boring and assembly necessary in prior art pumps, compensation for the resultant axial and angular misalignment must be made. This can be obtained by a coupling that allows axial and angular misalignment at the point of connection, but not at the point of contact of the rod 34 and plunger 54 with their respective packings 38 and 70. To connect the piston rod 34 to the plunger 54 in a manner to provide a connection tolerant of angular and axial misalignment, there is provided a coupling or connector 75 (FIG. 3). The coupling 75 includes a retainer 77 rigidly secured, in this embodiment, to the fluid plunger 54 through the utilization of a set screw 79. A connector head 76 is rigidly secured to the piston rod 34 by a set screw 78 and threads 80 on the tapered end of the piston rod 34. It should be noted that the retainer 77 may be secured to the rod 34 and the head 76 may be secured to the plunger 54. It is of no significance to which elements 34 or 54 each is attached.

Axial and angular movement of the connector head 76 is allowed relative to the retainer 77 through the utilization of the head 76 and its substantially hemispherical face 82. This face 82 abuts against and is complementary to the concave face 84 of the bearing 86. This bearing 86 is positioned between the closed end 88 of the retainer 77 and the hemispherical face 82 of the connector 76. The hemispherical configuration of the face 82 and the bearing face 84 allows slight axial and angular movement relative to each other.

This movement obviates the need for precision boring, but introduces possible damage to the rod 34 and plunger 54 due to impact on reversal of the stroke of the piston 28.

In order to allow this angular or axial misalignment while preventing separation and the subsequent impact, a plurality of Belleville washers 92 are employed. These washers 92 are positioned within the retainer 77 and behind a backup plate 90. Sufficient compression is imparted to the Belleville washers 92 against the backup plate 90 and, consequently, against the connector 76 and bearing 86 by threadably inserting a closure member 94 into the threaded opened end 96 of the retainer 77.

In this manner, sufficient compressible force can be imparted to the Belleville washers 92 and, thus, to the point of connection for the constant contact of the faces 82 and 84. This compressible force must be sufficient to prevent the separation of the faces 84 and 82 during reversal of the stroke of the piston 28 thereby preventing damage to either the rod 34 and plunger 54 and to their respective packings 38 and 70.

The operation of the pump 10 can be summarized as follows.

Gas is alternately introduced into chamber 26 through the interaction of the switches 30 and 32 and spool valve 20. The movement of the piston 28 reciprocates the piston rod 34 within the packing 38.

The piston rod 34 is connected to the plunger 54 by the connector 75. Accordingly, the reciprocating motion of piston 34 is also imparted to plunger 54 causing it to reciprocate in its packing 70. Upon the retraction of the plunger 54 out of the chamber 58, fluid is drawn into the chamber 58 through the inlet 50. Upon reversal of the plunger 54, fluid is pressurized in the chamber 58 and passes through the valve 64 and the inlet 52 to an oil well or the like.

During the reciprocating motion of the rod 34 and plunger 54, there may be slight angular misalignment of the piston rod 34 relative to the plunger 54. However, the coupling 75 compensates for this angular or axial misalignment preventing the plunger 54 or the piston 34 from moving improperly through the packings 70 and 38, respectively, thus resulting in possible destruction thereof. This is accomplished by interaction of the hemispherical face 82 and complementary face 84.

Moreover, though angular misalignment of the piston rod 34 and the plunger 54 is allowed, longitudinal separation of these elements is prevented by the Belleville washers 92 and the end cap 94. Accordingly, during reversal of the stroke of the piston 28, the plunger 54 and piston rod 34 are prevented from being longitudinally separated and brought together thereby preventing damage.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. In a reciprocating pump of the type including a pair of coaxial reciprocating and rectilinearly moving elements for pumping incompressible fluids, one reciprocating element being a piston rod driven by a pressure operated piston and the other being an incompressible fluid plunger slideably mounted in a plunger cylinder for pumping fluid, the improvement comprising:
    a coupling device for connecting said rod and said plunger, including
    a retainer on one of said members, said retainer comprising a body including a first open end and a second closed end and a side wall defined therebetween, said side wall and said second end defining a chamber within said body, a head on the other of said members,
    a plurality of Belleville washer means for resiliently maintaining said head in said retainer to prevent separation of said head and said retainer through the entire stroke of said rod and said plunger, and
    a bearing positioned within said chamber between said second end of said body and said head, said bearing being of substantially the same cross-sectional configuration and transverse dimension as said chamber, said bearing including a planar first end abutting a complementary portion of said second end of said retainer, said bearing also including a second end abutting a face of said head, said abutting relationships being the sole means supporting said bearing, said face being of a substantially hemispherical configuration and said second end of said bearing having a face of a complementary configuration to said face of said head, said bearing face and said head face held in abutting relationship throughout said stroke by said resilient means.

2. In combination
    a pump including a piston drive chamber, a piston reciprocally mounted within said chamber, valve means for alternately introducing pressurized fluid within said chamber on alternate sides of said piston to reciprocate said piston within said chamber, a housing secured to said chamber into which a piston rod attached to said piston extends, a plunger cylinder secured to said housing into which a pump plunger coupled to said piston rod by a coupling assembly extends, said plunger cylinder including a fluid chamber having a fluid inlet and outlet valve means adapted to be connected to a fluid system,
    said coupling assembly comprising a retainer defined by a cylindrical body having an open end and a closed end, and a cavity defined therebetween, said body being affixed to an end of said plunger, a head having a hemispherical face secured to an end of said piston rod, said head positioned within said body, a bearing positioned within said body between said closed end of said body and said face of said head, said bearing having a planar first end abutting a complementary portion of said closed end, said bearing being of substantially the same cross-sectional configuration and transverse dimension as said body, a second end of said bearing having a concave face mating with said hemispherical face of said head, said abutting and mating relationships being the sole means supporting said bearing, a retaining plate positioned within said body and between said head and said open end of said body, a plurality of biasing elements positioned within said body between said open end of said body and said retaining plate to bias said head against said bearing, and a closure member threadably secured in the open end of said body.

3. The apparatus claimed in claim 2 wherein said biasing elements comprise a plurality of Belleville washers.

* * * * *